March 13, 1956

J. H. CADIEUX ET AL 2,738,109

PLASTIC SEEDING ATTACHMENT FOR GRAIN DRILLS

Filed Jan. 19, 1953

INVENTORS
JOSEPH H. CADIEUX
& ROBERT L. ERWIN
BY
AND
ATTORNEYS

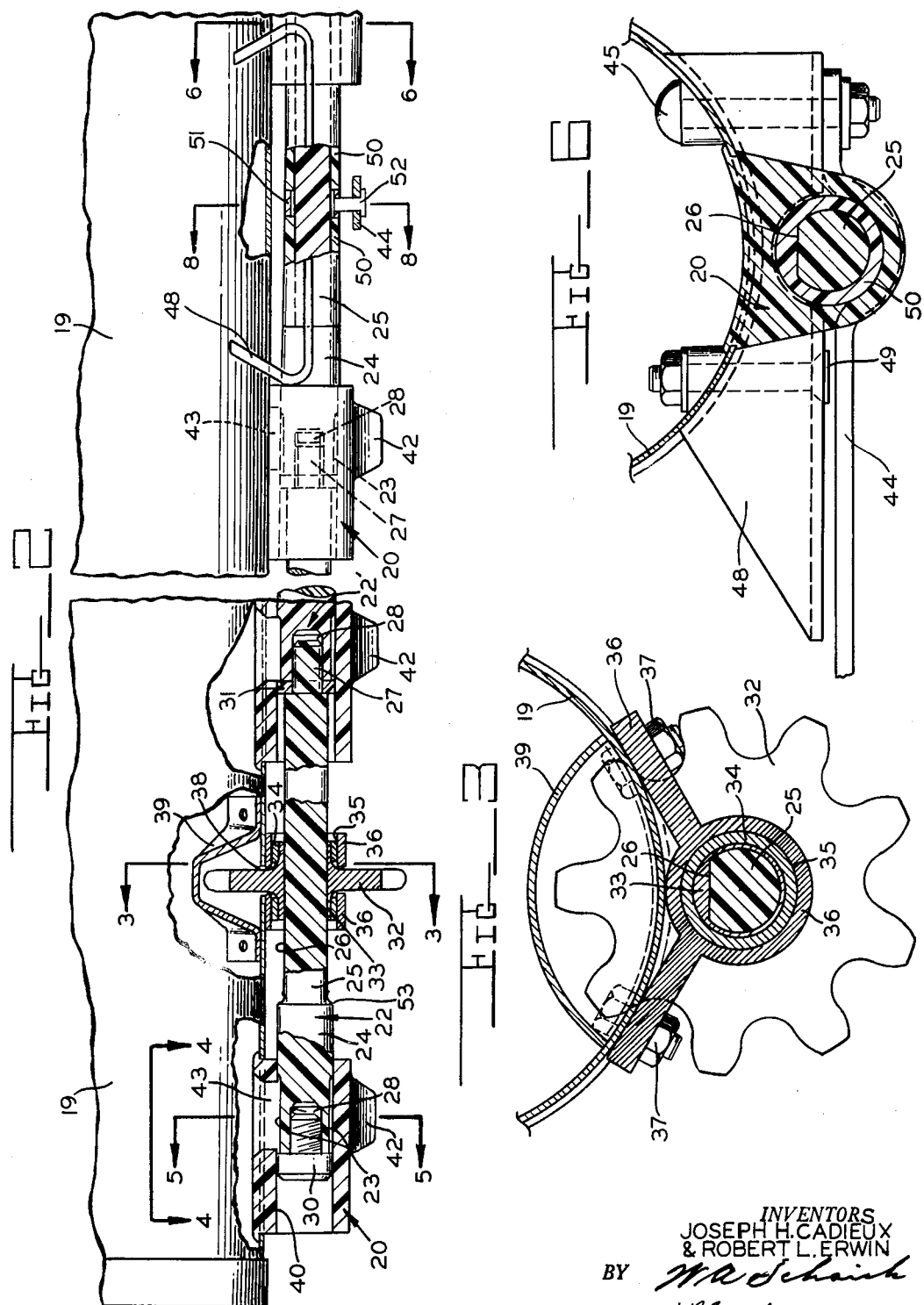

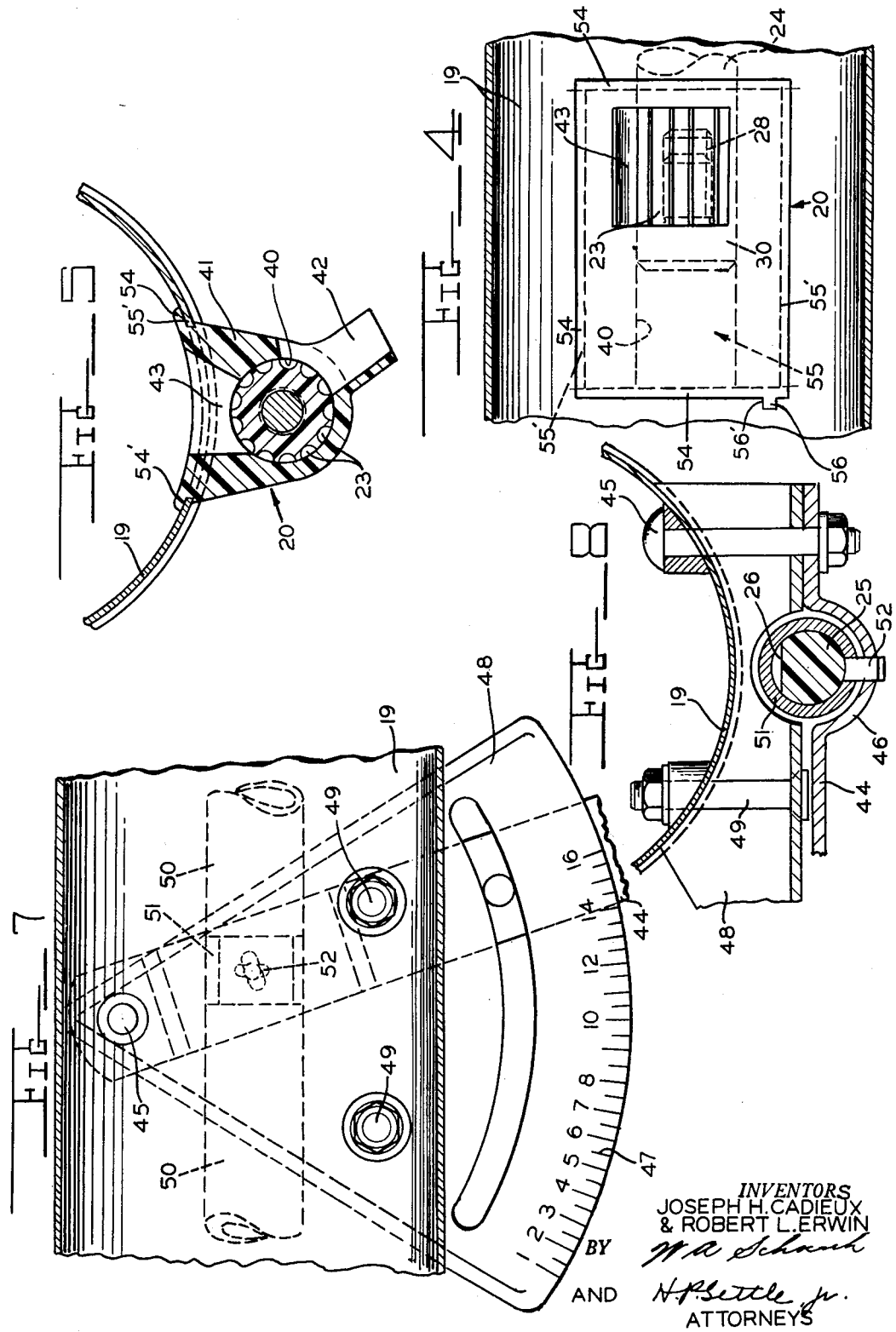

United States Patent Office 2,738,109
Patented Mar. 13, 1956

2,738,109

PLASTIC SEEDING ATTACHMENT FOR GRAIN DRILLS

Joseph H. Cadieux, Huntington Woods, and Robert L. Erwin, Royal Oak, Mich., assignors, by mesne assignments, to Ford Motor Company, Dearborn, Mich., a corporation of Delaware Application January 19, 1953, Serial No. 332,042

4 Claims. (Cl. 222—274)

This invention relates to a seed metering mechanism for a planting mechanism and more particularly to a seed metering mechanism economically formed of a plurality of identical, generally cylindrical seed metering elements secured together in end-to-end relationship.

In grain drills utilized for the planting of relatively small grain or grass seed, the conventional seed metering mechanism includes a seed case disposed beneath a seed hopper to receive seed therefrom by gravity feed. The conventional seed case generally takes the form of a hollow, intricate, iron casting within which a fluted seed wheel is positioned for rotatory movement to dispense the seed through the case to a depending dispensing chute, and the seed wheel is also laterally movable into and out of the case to vary the amount of seed fed thereby. Heretofore each feeding mechanism consisted of a peripherally fluted roller, cylindrical cut-off element, cutoff washer, etc. A series of such feeding mechanisms was assembled on and secured to a square drive shaft, running the length of the planter, by means of small cotter pins or the like. Due to the multiplicity of coacting parts which made up this relatively complicated mechanism, the assembly of said mechanism required the laborious hand operation of several men, and considerable man hours, to accurately fit and adjust said mechanism to proper working order. Repairs or replacement of worn or damaged parts was equally difficult to accomplish.

This invention provides a seed metering mechanism comprised essentially of identical one-piece units joined in end-to-end relationship and said one-piece units are readily adapted to modern techniques of manufacture and assembly.

More particularly, the seed metering mechanism of the present invention is comprised of a multiplicity of one-piece generally cylindrical, seed metering elements having a peripherally fluted seed feeding portion thereon adjacent a smooth cylindrical cutoff portion. These elements are all made alike and are readily mass-produced at low cost. These parts can be made, for example, by molding from a suitable plastic material. They can also be cast or machined from steel or other suitable materials, as will be obvious to one skilled in the art. In any case, both in fabrication and assembly, considerable savings can be realized.

It is, therefore, an important object of the present invention to provide an improved seed metering mechanism formed from a plurality of identical seed metering elements joined in end-to-end relationship.

Another important object of the present invention is to provide an improved seed feeding mechanism of simpler, more economical construction and containing fewer parts than conventional seed feeding mechanisms.

Another object of the present invention is to provide a seed metering mechanism having a simple one-piece seed case which is snapped into place in a mating opening in the seed hopper, thus automatically aligning said seed cases for subsequent, easy assembly, of the identical seed metering elements.

The specific nature of this invention, as well as other objects and advantages thereof, will become apparent to those skilled in the art from the following detailed description, taken in conjunction with the attached sheets of drawings, on which, by way of preferred example only, is illustrated one embodiment of this invention.

On the drawings:

Figure 2 is a front view of the seeding mechanism of the present invention with parts in fragmentary section;

Figure 3 is a sectional view taken along the plane 3—3 of Figure 2;

Figure 4 is a sectional view taken along the plane 4—4 of Figure 2;

Figure 5 is a sectional view taken along the plane 5—5 of Figure 2;

Figure 6 is a sectional view taken along the plane 6—6 of Figure 2; and

Figure 7 is a sectional view taken along the plane 7—7 of Figure 1; and

Figure 8 is a sectional view taken along the plane 8—8 of Figure 2.

As shown on the drawings:

Figure 1:
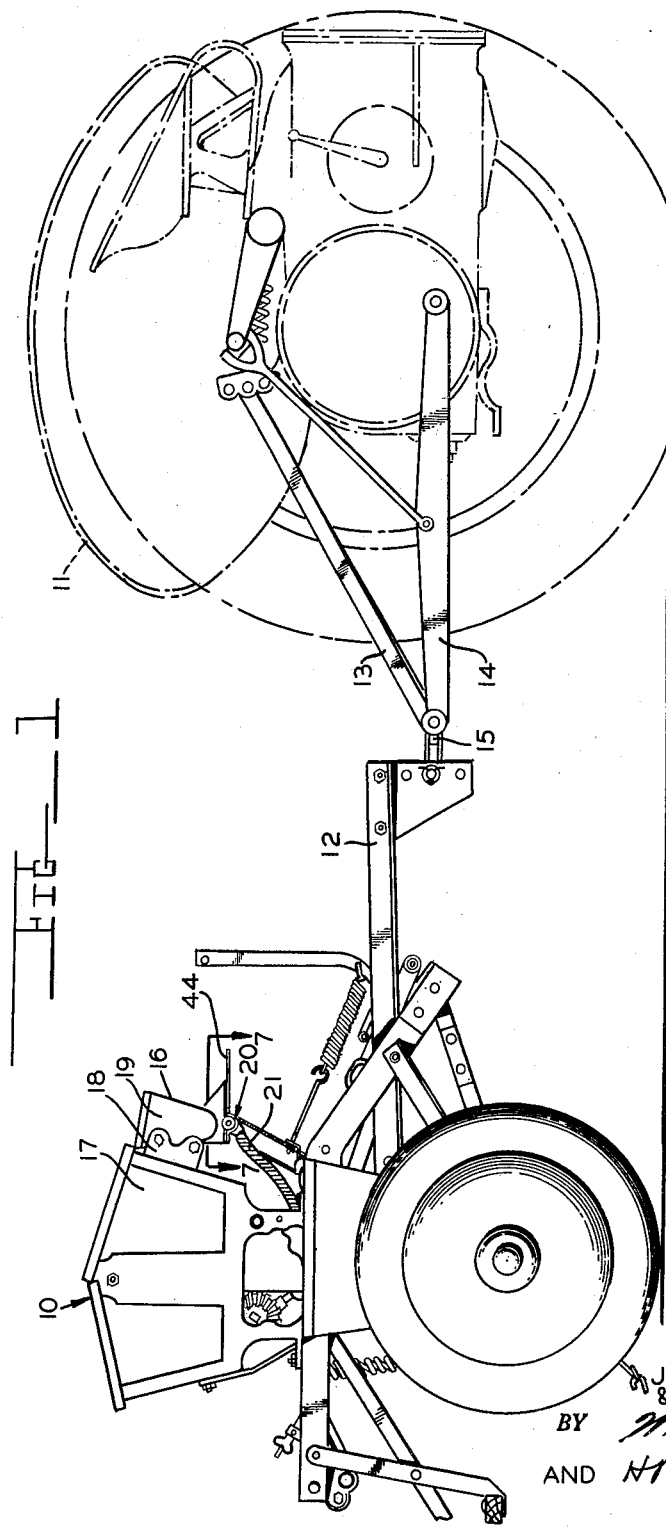
Figure 1 is a side view of a tractor drawn grain drill illustrating the seeding mechanism of the present invention mounted on said grain drill as a small grain seeding attachment.

In Figure 1, reference numeral 10 refers to a grain drill hitched to a tractor 11 of well-known make by means of hitch plate and tongue assembly 12 coacting with the laterally spaced stay bars 13 and draft links 14, and drawbar 15. A seeder attachment 16 is shown mounted on the front seed hopper 17 of the grain drill 10 by means of brackets 18. The seeder attachment has an upper seed hopper 19, fabricated from sheet metal, and adapted to contain small grain seed, grass seed or the like, for gravity flow down through a seed case indicated generally at 20. The seed case serves to meter the seed from the hopper 19 down to a dispensing chute 21 through which the seed falls by gravity to the ground.

As best illustrated in Figure 2, the seed metering mechanism comprises a plurality of generally cylindrical one-piece elements 22 connected in end-to-end relationship to form a seed feeding mechanism of suitable length. These one-piece elements can be fabricated of any suitable material, as mentioned hereinbefore, and have a peripherally fluted seed feeding portion 23 adjacent a smooth cylindrical grain cutoff portion 24. The cutoff portion 24 lies adjacent a generally cylindrical portion 25 having a flat 26 formed thereon, as best shown in Figure 3. The end of the element terminates in an externally threaded portion 27. The opposite end of the element has an internally threaded bore 28 adapted to receive the externally threaded portion 27 of another element as shown generally at 22'.

A cylindrically headed cap screw 30, having an external thread which mates with the internal thread 28 is fastened to the end element 22, as shown, to provide a second cutoff portion adjacent the fluted seed feeding portion 23. A suitable washer 31 is fitted between the seeding elements when assembled to act as a second cutoff portion adjacent the next fluted seed portion, etc.

Any suitable means may be provided to rotate the assembled seed metering mechanism and, as shown in Figures 2 and 3, may comprise a sprocket 32 having a hub 33 shaped to slidably fit over the portion 25 of a seeding element. The hub has sleeves 34 fastened over each of its end portions to provide bearing surfaces which snugly fit within the bearing bores 35 of the supporting brackets 36. The supporting brackets are attached to the hopper 19 by means of bolts 37. Clearance for the rotation of the sprocket is provided by opening 38 in the bottom of the hopper and this opening is covered by shield 39 which prevents loss of seed from the hopper. As the fluted portions rotate, as indicated in Figure 5, the cutoff portion 41 of the seed case allows the fluted portions to fill with seed which is carried forward and downward and dropped into the dispensing snout 42.

Provision is made for varying the flow of seed by axially slidably mounting the seed metering elements with relation to the inlet openings 43 of the seed cases 20 and the sprocket 32. As shown in Figures 2 and 4, the fluted portions 23 are substantially completely exposed to the inlet openings of the seed cases and thus are set to deliver the maximum flow of seed. A handle 44, as shown generally in Figure 1 and in detail in Figures 7 and 8, is mounted by bolt 45 at its rearward end and has an arcuate portion 46 passing under the seed feeding element and out to the front of the seeder beneath a graduated seed delivery scale 47 suitably stamped or engraved on the forward edge of bracket 48. The bracket is fastened to the hopper by means of bolts 45 and 49.

As shown in Figure 2, spacers 50 are placed on the shaft portion 25 on either side of a shifter ring 51 having a rivet 52 therein which passes through a hole in the handle 44. By moving the handle to the left or right, the feeding element is shifted as desired for increasing or decreasing the flow of grain, the rotational speed of the seeding mechanism remaining constant.

The right end of the assembled seed metering mechanism is terminated with a seed metering element which has been cut off at the shoulder 53, Figure 2, and secured to the neighboring element by threading as disclosed hereinbefore.

It is an important feature of the present invention that the seed cups 20 snap into the openings 55 in the bottom of the hopper. The manner in which these parts are assembled is illustrated in Figures 4 and 5. The seed cups have a lip portion 54 below which is a recessed portion 54' formed along the sides near the top. These seed cups are fastened in place by simply dropping them properly oriented into the hopper openings and pushing down to snap them into place. The hopper is, of course, fabricated from sheet metal. The rectangular openings 55 in the hopper, as shown in Figure 4, have resilient flaps 55' formed by cutting the sheet metal, as indicated at the ends. This construction allows the side edges 55' to have sufficient resiliency to spring downward and outward while the seed cups are being pressed into place, and then spring back into the recesses 54' below the lips 54 to hold said seed cups in place. The openings 55 in the hopper can be accurately laterally aligned during the manufacture of the hopper, and, the alignment of the seed cup bores 40 and the seed metering elements 22 is automatically assured thereby.

Of course it will be obvious to one skilled in the art that a suitable indexing device such as a nib 56 can be formed on the seed cup, as shown in Figure 4. Also a mating opening 56' can be formed in the hopper 55. Thus the seed cases will fit in only one position and thereby be properly oriented on assembly to the hopper.

The advantages of the present invention over former cast seed cases and complex feeding mechanisms with their many parts will be apparent to those skilled in the art. The use of simple one-piece seed cases, particularly when molded from plastics, substantially reduces manufacturing costs while at the same time provides a smooth bore, so that accurate seed cutoff is assured. The one-piece seed metering elements of simple design and ease of manufacture further substantially reduce manufacturing and assembly costs. The simple construction of the elements and the reduced number of parts in the present mechanism promote rapid and easy assembly of the completed units. Alignment of parts is automatically effected and adjustment after assembly is substantially completely eliminated. In conclusion, the instant invention provides a simplified and economical seed metering mechanism having the functional and structural advantages hereinbefore set forth.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a seed planting mechanism comprising a sheet metal seed containing hopper having a series of aligned openings in a wall thereof the improvement comprising a series of hollow seed feeding cases insertable in said openings, each of said seed cases having a peripherally extending recess formed along its upper side portions, the edges of each of said openings being defined by resilient flap portions constructed and arranged to coact with said recesses of a corresponding seed case to detachably hold said seed cases in assembled relationship to said hopper.

2. A seed planting mechanism comprising a seed containing hopper having a series of aligned openings in a wall thereof, said openings being rectangular in shape and having two of their opposing edges defined by resilient flap portions, a series of individual hollow seed cases having spaced inlet and discharge openings therein, each of said seed cases having a peripherally extending recess formed along its upper side portions, constructed and arranged to receive the outer edges of said flap portions to detachably hold said seed cases in assembled relationship to said hopper, and a plurality of seed metering elements respectively rotatable in said seed cases and cooperating therewith to produce a metered flow of seed from said seed hopper, said seed metering elements being detachably joined in end-to-end relationship.

3. A seed planting mechanism comprising a hopper having a series of openings in a wall thereof, a series of unitary hollow seed cases having spaced inlet and discharge openings therein, means for securing said seed cases to said hopper with said inlet openings communicating with said hopper through said openings in said hopper, said seed cases each having a laterally disposed bore, a plurality of identical generally cylindrical seed metering elements detachably joined in end-to-end relationship, said seed metering elements being respectively insertable into said bores of said seed cases in snugly fitting relationship, each of said feeding elements having thereon a peripherally fluted seed feeding portion adjacent a cylindrical cut off portion, a cylindrically headed cap screw threaded into the end seed metering element to provide a second cutoff portion adjacent the peripherally fluted seed feeding portion of said seed metering element, and means for rotating said seed metering elements to thereby meter seeds through said seed cases.

4. A seed planting mechanism comprising a hopper having a series of openings in a wall thereof, a series of unitary hollow seed cases having spaced inlet and discharge openings therein, means for securing said seed cases to said hopper with said inlet openings communicating with said hopper through said openings in said hopper, said seed cases each having a laterally disposed bore, a plurality of identical generally cylindrical seed metering elements detachably joined in end-to-end relationship, said seed metering elements being respectively insertable into said bores of said seed cases in snugly fitting relationship, each of said seed feeding elements having thereon a peripherally fluted seed feeding portion adjacent a cylindrical cut off portion, washers respectively fitted between adjacent seed feeding elements to provide a second cut off portion adjacent the peripherally fluted seed feeding portion of said seed metering elements, and means for rotating said seed metering elements to thereby meter seed through said seed cases.

References Cited in the file of this patent

UNITED STATES PATENTS

| | | |
|---|---|---|
| 315,168 | Riter | Apr. 7, 1885 |
| 694,069 | Noechel | Feb. 25, 1902 |
| 818,396 | Torres | Apr. 17, 1906 |
| 824,762 | Ullrich | July 3, 1906 |
| 1,712,797 | Johnston et al. | May 14, 1929 |
| 2,115,167 | Hoke | Apr. 26, 1938 |
| 2,432,437 | Murphy | Dec. 9, 1947 |